UNITED STATES PATENT OFFICE 2,198,374

CYCLIC CONDENSATION PRODUCT

Herman A. Bruson and John W. Kroeger, Philadelphia, Pa., assignors to Röhm & Haas Company, Philadelphia, Pa.

No Drawing. Application December 7, 1938, Serial No. 244,356

18 Claims. (Cl. 260—621)

This invention relates to the condensation of 1,4-butylene glycols having at least one hydrocarbon substituent on each of the terminal carbon atoms, or the halides or dehydration products thereof, with aromatic compounds having adjacent nuclear hydrogen atoms available for substitution.

According to this invention, any 1,4-glycol or 1,4-dihalide of the general formula—

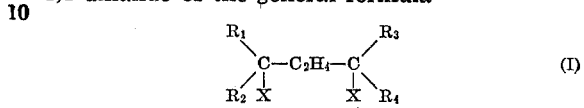

wherein X is hydroxyl or halogen, $R_1$ and $R_3$ are each hydrocabon groups and $R_2$ and $R_4$ are hydrogen or hydrocarbon groups, is condensed with any aromatic compound having at least two labile nuclear adjacent hydrogen atoms, in the presence of cationoid condensing agents, so as to split out water or hydrogen halide respectively. The products obtained by this process have the general formula—

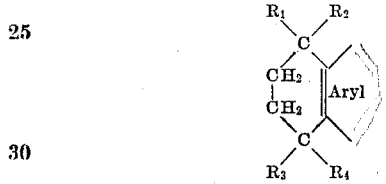

or a cyclic configuration isomeric therewith, wherein the ring fragment designated "aryl" represents any aromatic residue.

The reaction may be formulated as follows:

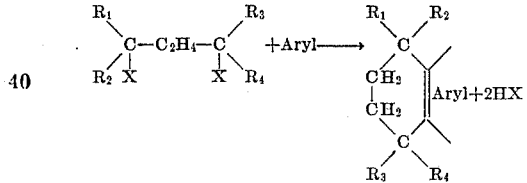

In the case of substituted aromatic groups, reaction products of the following general type are obtained—

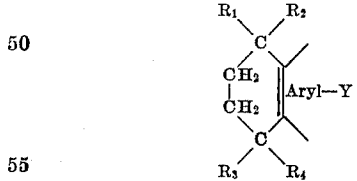

wherein Y represents a member of the group consisting of halogen atoms, hydrocarbon, OH or OR radicals in which R is an aliphatic, aromatic, arylaliphatic or cycloaliphatic hydrocarbon radical. More than one such substituent may be present.

In place of 1,4-glycols or 1,4-dihalides there may be used the corresponding substituted tetrahydrofuranes (II) and substituted diolefines (III and IV) of the following type structures:

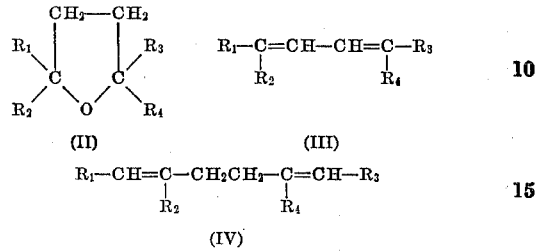

where $R_1$, $R_2$, $R_3$, and $R_4$ have the same significance as mentioned above. These compounds are derivable from the glycols by removal of one or two molecules of water or from the halides by removal of two molecules of hydrogen halide. The monolefinic compounds theoretically obtained by removal of one mol water or hydrogen halide from the glycols or dichlorides can also be used, as for example the olefinic monoalcohol—

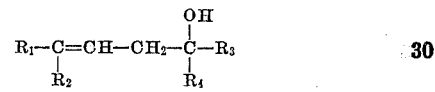

or the olefinic monohalide—

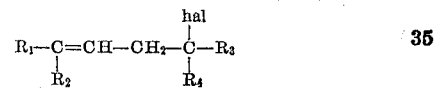

Such compounds are probably formed at an intermediate stage in the condensation when the glycols or dihalides are used as starting materials, and for the purpose of this invention are considered to be equivalent to the glycols or the dihalides specified herein.

In certain cases more than one ortho-condensed ring can be formed with a single aromatic nucleus; for instance, from benzene, a product possessing three condensed carbocyclic rings, and from naphthalene, a product possessing four condensed carbocyclic rings. Such compounds may be represented in a general way as follows—

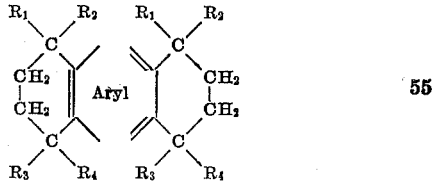

By this means, it becomes possible to synthesize a wide variety of hitherto unknown condensed ring compounds containing gem-substituted hydrocarbon groups. These compounds are useful as intermediates for dyes, drugs, insecticides, plastics, and textile or tanning assistants. This new process may be termed a "cycli-alkylation" process, the term "cycli-alkylation" being defined as an alkylation reaction involving the introduction of a new saturated divalent group into an aromatic compound so as to form a condensed ring.

The condensation, in accordance with the present invention, is carried out advantageously in the presence of acidic condensing agents capable of splitting out water or hydrogen halide and capable of causing addition to olefinic double bonds. Such agents are hereinafter referred to as "cationoid" condensing agents and include the following typical substances—

(a) Friedel-Crafts catalysts such as the anhydrous chlorides or bromides or aluminum, tin, antimony, titanium, bismuth, mercury, copper, iron, boron or zinc.

(b) Boron trifluoride or its complex addition products with organic or inorganic acids, or with ketones, ethers, alcohols, or phenols; notably fluoboracetic acid, fluoboric acid, dihydroxy fluoboric acid, boron fluoride-diethyl ether, boron fluoride-acetone, boron fluoride-methanol, and boron fluoride-phenol complex.

(c) Sulfuric acid, aromatic or aliphatic sulfonic acids, such as naphthalene sulfonic acid, hydrogen fluoride, phosphoric acid, phosphoric anhydride, phospho-tungstic acid, perchloric acid, phospho-molybdic acid, chlorostannic acid, hydrogen bromide, and hydrogen chloride. These acids belong to the class of relatively strong inorganic acids, which are non-oxidizing under the conditions imposed.

(d) Surface-active siliceous clays, such as "Tonsil", "Frankonite", "Floridin", "Atapulgas" and "Terrana" clays. These are primarily aluminum hydrosilicates which may contain magnesium, calcium, and other metal oxides. They are usually acid-washed clays of high absorptive capacity.

The cationoid condensing agents have been shown to be protons and sources of protons, such as acids, metal atoms which are capable of forming coordination systems, atoms and free radicals with incomplete electron shells and the like. The catalytically active materials all fall in one or another of these classes.

When X is hydroxyl, or when the corresponding diolefines are employed, any of the above acidic catalysts can be used as the condensing agent; whereas for the splitting out of hydrogen halide (where X is halogen), compounds listed in (a) and (b) are the most useful.

We have observed that in some cases two different catalysts will yield two different isomers. For example, phenol, when condensed with 2,5-dimethyl hexanediol-2,5,

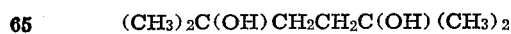

in the presence of aluminum chloride, yields predominantly a hydrogenated naphthol derivative M. P. 145° C. and when condensed in the presence of 77% sulfuric acid as a catalyst, it yields an isomeric derivative, M. P. 96—97° C. The acid, surface-active clays, phosphoric acid, boron trifluoride and its complex addition products, also give large proportions of the lower melting isomeric derivative, particularly at higher reaction temperatures. At lower temperatures, however, boron fluoride reacts to yield the same products as aluminum chloride does at higher temperatures. It is therefore believed that the isomers differ from each other by a shifting of one or more alkyl groups to form an isomeric carbocyclic group.

The reactions contemplated by the present invention are applicable to the most diverse types of aromatic compounds. The term "aromatic compounds" is meant to include substances which are known to behave like aromatic compounds such as furane and its derivatives, and thiophene, which do not necessarily possess a six-membered ring. Any aromatic hydrocarbons or their nuclear substituted derivatives, which are reactive in Friedel-Craft's condensations and which possess at least two labile, adjacent, nuclear hydrogen atoms, are amenable to the reaction. Among these may be mentioned—

Benzene, naphthalene, anthracene, phenanthrene, or higher polycyclic ring systems and their nuclear alkyl, aralkyl, cycloalkyl, aryl, halogen, hydroxy, alkoxy, aryloxy, acyl, acylamino, and thioether derivatives including more specifically the following—

Benzene, toluene, xylene, cymene, ethyl benzene, ter-butyl benzene, n-amylbenzene, iso-octyl benzene, sec-dodecyl-benzene, n-hexadecylbenzene, n-octadecylbenzene, diphenyl ethane, diphenyl, cyclohexylbenzene, hydrindene, naphthalene, tetralin, thiophene, monochlorbenzene, monobrombenzene, o-dichlorbenzene, o-chlortoluene, phenol, o-cresol, 1,2,6-xylenol, pyrocatechol, o-phenyl-phenol, o-chlorphenol, o-bromphenol, guaiacol, anisole, phenetole, phenyl-octyl ether, o-nitro-anisole, diphenyl ether, diphenylene oxide, diphenyl sulfide, acetanilide, α-naphthol and their homologues and obvious equivalents. Any aromatic compound which has at least two adjacent nuclear hydrogen atoms readily available for replacement can be used with one or another of the acidic catalysts. Higher polynuclear aromatics react similarly to the lower aromatics, but since the reaction products are a mixture of isomers resulting from the plurality of reactive positions, the products are resinous and not easily separated.

In the formulae above, the groups R1, R2, R3, and R4, insofar as they may be hydrocarbon groups, may contain from 1 to 18 (or more) carbon atoms, which, if aliphatic, can be either straight or branched in character. If aromatic, they may be mononuclear or polynuclear and may contain inert nuclear substituents such as hydrocarbon, halogen, or alkoxy groups.

This invention will now be illustrated by a number of typical examples to show its application to readily available compounds, it being understood, however, that these examples are not to be construed as limiting the invention to the particular members, temperatures, proportions or reaction conditions, but can be carried out with the obvious equivalents of the reactants and cationoid catalysts under a wide variety of conditions.

*Example 1.*—(a) A mixture consisting of 15 g. of 2,5-dichloro-2,5-dimethyl hexane, 47 g. of phenol, and 0.5 g. of anhydrous powdered aluminum chloride was stirred for 2 hours at 25-30° C. and then at 50° C. for 3 hours at which time evolution of hydrogen chloride had practically ceased. The dark red, crystalline mass thus obtained was hydrolyzed with dilute hydrochloric acid and the excess phenol steam-distilled off. The residue (23 g.) was crystallized from benzene. It formed colorless needles, M. P. 145.5° C., analyzing $C_{14}H_{20}O$ and having the probable formula—

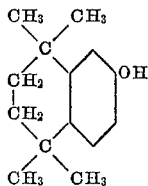

It gives a difficultly soluble sodium salt with aqueous 10% sodium hydroxide solution. It condensed with formaldehyde in alcoholic hydrochloric acid solution to yield a methylene derivative, M. P. 232° C.

(b) A mixture consisting of 21 g. of 2,5-dimethyl hexanediol-2,5, 54 g. of phenol, 200 cc. of petroleum naphtha, and 50 g. of anhydrous aluminum chloride was stirred at 85–90° C. for 8 hours. After hydrolysis of the reaction product with dilute hydrochloric acid, the organic layer was distilled under reduced pressure. The desired product distilled over between 150° and 165° C./3 mm. (mostly at 152° C./3 mm.) and was a crystalline compound identical with that described in (a) above.

(c) A mixture consisting of 13 g. of phenol, 13 g. of anhydrous aluminum chloride, 30 g. of petroleum ether (B. P. 90–100° C.) and 12.8 g. of 2,2,5,5-tetramethyl tetrahydrofurane—

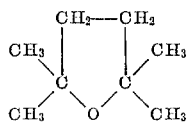

(obtained by dehydration of 2,5-dimethylhexanediol-2,5 with sulfuric acid) was stirred with cooling at 25–30° C. for 5 hours and then boiled under reflux for 2 hours. The product was hydrolyzed with iced dilute hydrochloric acid. The crystalline mass which separated weighed 16 g. and melted crude at 133–138° C. After recrystallization from petroleum ether, it melted at 143–145° C. and was identical with the product obtained in (a) and in (b) above.

(d) A mixture consisting of 21 g. of 2,5-dimethyl-1,5-hexadiene, 23 g. of phenol, 2 g. of anhydrous aluminum chloride, and 30 g. of petroleum ether (B. P. 90–100° C.) was stirred with cooling at 10° C. and then dry hydrogen chloride was bubbled in for five minutes. After stirring for one hour at 25–35° C. the mixture was refluxed for three hours and then hydrolyzed with water. The product, on distillation in vacuo, came over at 120–175° C./2 mm. (mainly at 135–140° C./2 mm.) as a syrup which, upon cooling, crystallized. After recrystallization from petroleum ether, it melted at 142–144° C. and was identical with the product described in (a) above.

Example 2.—(a) A mixture consisting of 5 g. of 2,5-dichlor-2,5-dimethyl hexane, 6 g. of ortho-cresol, and 0.2 g. of aluminum chloride was stirred until evolution of hydrogen chloride ceased, then warmed at 95–100° C. for 7 hours. Upon hydrolysis with water and removal of unchanged cresol by steam-distillation, there was obtained 7 g. of a product which, after crystallization from petroleum ether, formed colorless crystals M. P. 126° C., analyzing $C_{15}H_{22}O$ and having the probable formula—

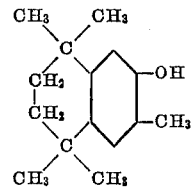

It is soluble in hot 10% sodium hydroxide solution. The sodium salt crystallizes out on cooling.

(b) In a similar manner, meta-cresol gave a quantitative yield of a crystalline compound, $C_{15}H_{22}O$, M. P. 134–135° C. having the probable formula—

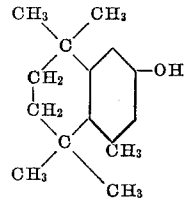

Its acetic ester is an oil boiling at 165° C./10 mm.

(c) To a solution of 30 g. of petroleum ether (B. P. 90–100° C.), containing 22 g. of pure para-cresol, in which 5 g. of boron trifluoride had previously been dissolved, there was added dropwise, while stirring, but without cooling, 22 g. of 2,5-dimethyl-1,5-hexadiene. The mixture was heated at 60–75° C. for 4 hours, and then hydrolyzed with dilute soda solution. The oil layer was washed and distilled in vacuo.

The fraction boiling between 155 and 190° C./2 mm. solidified and after recrystallization from petroleum ether, gave colorless crystals, M. P. 193–195° C. Its empirical formula, $C_{23}H_{36}O$, and the fact that it forms no salts with alkali hydroxides indicate that it is an ether containing 2 condensed rings attached to the p-cresol nucleus. It may be represented by the probable formula:

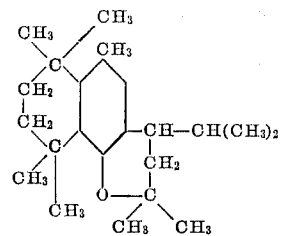

Example 3.—A mixture consisting of 5 g. of 2,5-dichlor-2,5-dimethyl hexane, 7 g. of ortho-chlorphenol, and 0.2 g. of aluminum chloride was stirred at 95–100° C. for 17 hours. The product was hydrolyzed with dilute hydrochloric acid and the dark oil layer taken up in benzene, washed and distilled. The product distilling at 120–147° C./1 mm. crystallized on cooling. (Yield 4 g.) Upon recrystallization from carbon tetrachloride, it formed colorless needles, M. P. 103.5–104° C., analyzing $C_{14}H_{19}OCl$ and having the probable formula—

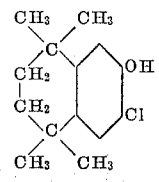

*Example 4.*—(a) A mixture of 5 g. of 2,5-dichloro-2,5-dimethyl hexane and 5 g. of orthophenylphenol in 50 g. of ethylene dichloride was mixed with 0.5 g. of anhydrous aluminum chloride and stirred and refluxed for six hours. The reaction mixture was cooled and hydrolyzed with excess dilute hydrochloric acid. The ethylene dichloride layer was separated and evaporated to dryness on a steam bath. The sirupy, dark residue was dissolved in petroleum ether, boiled with charcoal and the clear, filtered solution evaporated to dryness. The product formed a yellow sirup which crystallized on standing. Yield 7 g. Upon recrystallization from petroleum ether (60–100° C.), it formed colorless fine needles, M. P. 98–98.5° C., analyzing $C_{20}H_{24}O$ and having the probable formula—

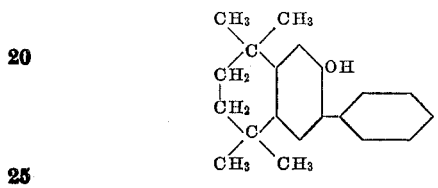

(b) In the same manner, 2,5-dichloro-2,5-dimethyl hexane and ortho-cyclohexyl phenol condensed in the presence of aluminum chloride to yield the compound—

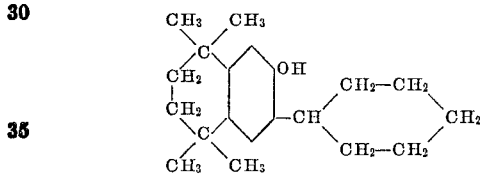

It formed colorless crystals, M. P. 109–110° C.

*Example 5.*—A mixture consisting of 3.5 g. of aluminum chloride (anhydrous) and 3.5 g. of phenoxyacetic acid in 30 g. of ethylene dichloride was warmed until solution occurred. To the cooled solution 4 g. of 2,5-dichlor-2,5-dimethyl hexane was added and the mixture stirred for one hour at room temperature and then refluxed for five hours. The mixture was hydrolyzed with excess dilute hydrochloric acid, the organic layer separated and the solvent evaporated. The crystalline product (5.5 g.) was dissolved in boiling petroleum ether, dechlorized with Norit, and the solution filtered. After the filtrate had cooled, the product separated in colorless plates which, after recrystallization from 33% alcohol solution, melted at 164–165° C., and analyzed $C_{16}H_{22}O_3$. It has the probable formula—

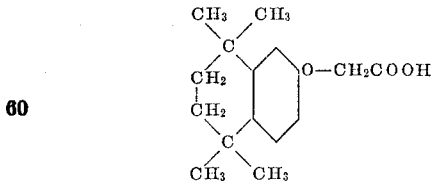

and is identical with the oxyacetic acid derivative obtainable by treatment of the product from Example 1 with caustic soda and chloracetic acid.

*Example 6.*—A mixture of 5 g. of 2,5-dichlor-2,5-dimethyl hexane, 7 g. of guaiacol, and 0.3 g. of aluminum chloride was stirred until foaming ceased and then heated 7 hours on a steam bath. The product was hydrolyzed with dilute hydrochloric acid, the oil taken up in benzene, washed, dried and distilled. The product which distilled at 138–145° C./2 mm. as a colorless oil was collected. The yield was 5 g. Upon redistillation, it boiled at 138° C./2 mm. Its probable formula is—

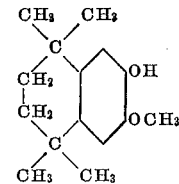

*Example 7.*—A mixture consisting of 5 g. of 2,5-dimethyl 2,5-dichloro-hexane, 7 g. of phenetole, and 0.5 g. of aluminum chloride was stirred until foaming ceased, then heated at 95–100° C. for 16 hours. Upon hydrolysis of the product, a brown oil separated containing a small quantity of the crystalline product described in Example 1. After removal of this by-product by filtration, the residual oil was washed with hot caustic soda solution and distilled in vacuo. The fraction boiling at 125° C./2 mm. (yield 6 g.) has the probable formula—

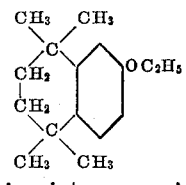

*Example 8.*—A mixture consisting of 26 g. of 5,14-diethyl 8,11-dimethyl-8,11-dichloro-octadecane, 12.5 g. of phenol and 50 cc. of petroleum ether was mixed with 8 g. of anhydrous aluminum chloride and refluxed for 10 hours on the steam bath with constant stirring. The product was hydrolyzed with dilute hydrochloric acid and the solvent and excess phenol were removed by steam distillation. The residual oil was fractionally distilled in high vacuo. The product boiling at 225–240° C./2 mm. (yield 19 g.) was a yellow syrup consisting chiefly of material having the probable formula—

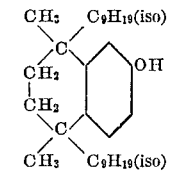

The diethyl dimethyl dichloro-octadecane used above was obtained by condensing calcium carbide in the presence of potassium hydroxide with technical "undecanone" (5-ethyl-nonane-2) to yield the acetylenic glycol, as described in copending application Serial No. 232,852 filed October 1, 1938. This glycol was catalytically reduced with Raney nickel at 75–85° C. and 100 lbs. pressure per square inch to give the corresponding saturated 5,14-diethyl-8,11-dimethyl-8,11-dihydroxy octadecane which was then treated with hydrogen chloride.

*Example 9.*—A mixture consisting of 5 g. of 2,5-dichloro-2,5-dimethyl hexane, 6 g. of m-hydroxyphenoxyethoxyethyl chloride (m—HO—$C_6H_4$—O—$C_2H_4$—O—$C_2H_4Cl$)

and 0.5 g. of aluminum chloride was heated at 65° C. for 4 hours. The syrup obtained was hydrolyzed in the cold with dilute hydrochloric acid and the dough-like mass was taken up in acetone, filtered, and precipitated with water. The product separated as a thick oil which crystallized in the cold. Upon recrystallization from petroleum ether, the product separated in colorless crystals, M. P. 107-108° C., having the empirical composition $C_{18}H_{27}O_3Cl$ and the probable formula—

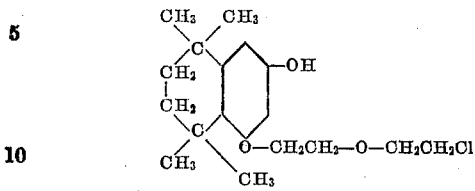

From the filtrate a small quantity of crystalline product M. P. 71-75° C. was obtained having the same empirical composition. It is apparently an isomer of the above.

*Example 10.*—A mixture consisting of 9 g. of 2,5-dichloro-2,5-dimethyl hexane, 6.4 g. of naphthalene, 3.3 g. of aluminum chloride and 30 g. of petroleum ether (B. P. 60-100° C.) was stirred for 16 hours at room temperature and then refluxed for an hour to complete the reaction. The reaction mixture was hydrolyzed with dilute hydrochloric acid and the yellowish crystalline solid (11 g.) filtered off and dried. It was purified by crystallization first from benzene containing a little alcohol and acetone and finally from benzene. The product separated in colorless, glistening plates, M. P. 317-318° C. The yield was 5.5 g. Its analysis and molecular weight agree with the formula $C_{26}H_{36}$, indicating that two hydroaromatic rings have become attached to the naphthalene nucleus, probably as—

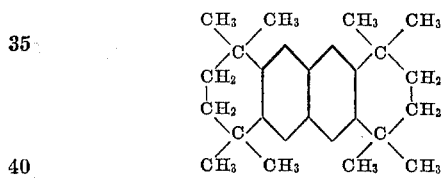

*Example 11.*—A mixture consisting of 14 g. of orthochlortoluene, 18 g. of 2,5-dimethyl-2,5-dichlorhexane, 20 g. of petroleum ether (B. P. 60-100° C.) and 1 g. of anhydrous powdered aluminum chloride was stirred for several hours at room temperature and then boiled for 4 hours under reflux. The mixture was hydrolyzed with excess dilute hydrochloric acid, the organic layer was separated, washed with water, and distilled. The fraction boiling at 120-150° C./5 mm. weighed 14 g. It solidified to a crystalline mass which was purified by recrystallization, first from petroleum ether, and finally from methanol. The product formed colorless needles, M. P. 105° C., having the empirical composition $C_{15}H_{21}Cl$ corresponding to the probable formula—

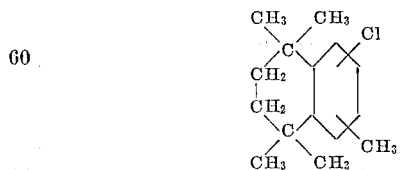

*Example 12.*—(a) A mixture consisting of 35 g. of 7,10-dimethyl-hexadecanediol-7,10, 13 g. of phenol, 17 g. of anhydrous, powdered aluminum chloride, and 50 g. of petroleum ether (B. P. 90-100° C.) was stirred at 5-10° C. until evolution of hydrogen chloride ceased. It was then stirred at 25-30° C. for 20 hours and finally refluxed for 6 hours on a steam bath. The mixture was hydrolyzed with dilute hydrochloric acid, washed with water and distilled. The product boiling between 180° and 250° C./5 mm. was collected. Upon refractionation, a cut B. P. 220-225° C./5 mm. was obtained (17 g.) as a pale yellow oil analyzing $C_{24}H_{40}O$ and corresponding to the probable formula—

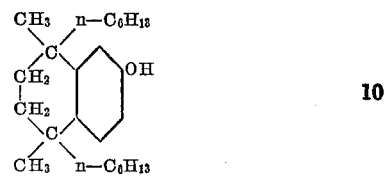

(b) A mixture consisting of 30 g. of 7,10-dimethyl-hexadecadiene-7,9, 14 g. of phenol, 50 g. of petroleum ether (B. P. 90-100° C.) and 2 g. of aluminum chloride, into which dry hydrogen chloride had been bubbled for five minutes, was refluxed for 6 hours, then was hydrolyzed with dilute hydrochloric acid. When the oil layer was distilled, 19 g. of pale yellow oil was collected between 180° and 250° C./4 mm. Upon redistillation, the product boiled from 218-225° C./4 mm. (B. P. 222° C./4 mm.) and corresponded to the compound obtained in the preceding experiment.

*Example 13.*—20 g. of tetraphenylbutanediol-1,4, $(C_6H_5)_2$—$C(OH)CH_2CH_2C(OH)(C_6H_5)_2$, 8 g. of o-cresol, 50 g. of petroleum ether (B. P. 90-100° C.) and 17 g. of aluminum chloride was stirred and refluxed for 20 hours. After hydrolyzing with dilute hydrochloric acid the crystalline precipitate obtained was purified by crystallization from toluene. It formed colorless needles M. P. 326° C. having the formula $C_{35}H_{30}O$ corresponding to the probable structure—

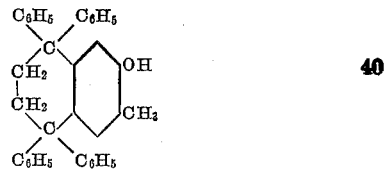

*Example 14.*—A mixture consisting of 30 g. of phenol, 34 g. of hexandiol-2,5, and 96 g. of 77% sulfuric acid was stirred for 8 hours at 90-95° C. The mixture was diluted with water and extracted with benzene. After washing the benzene extract with water, it was distilled in vacuo. The fraction which came over at 150-170° C./4 mm. (B. P. 160° C./4 mm.) was a pale yellow oil which did not readily crystallize, the analysis of which corresponded to the formula $C_{12}H_{16}O$.

*Example 15.*—(a) A mixture consisting of 96 g. of 77% sulfuric acid, 25 g. of phenol and 54.4 g. of 2,5-dimethyl hexane-diol-2,5 was stirred in the cold for 24 hours and then heated one hour at 85-95° C. The product was poured into cold water and the oil which separated was dissolved in benzene, washed and distilled in vacuo. The product boiling at 145-170° C./5 mm. (30 g.) formed a colorless oil which crystallized in the cold. After recrystallization from petroleum ether to constant melting point, it formed colorless crystals M. P. 96-97° C., analyzing $C_{14}H_{20}O$. It was soluble in hot 10% sodium hydroxide solution; the sodium salt crystallizing on cooling. It did not give a crystalline methylene derivative with alcoholic hydrochloric acid and formaldehyde. The compound is apparently isomeric with that described in Example 1.

(b) To a mixture of 18 g. of 2,5-dimethyl-1,5-hexadiene and 19 g. of phenol there was added slowly, with cooling and stirring, 2 g. of 96% sulfuric acid. The mixture was stirred for 14 hours during which time the temperature was kept between 28° and 32° C. The product was neutralized with soda solution, washed and distilled. The fraction, B. P. 120–160° C./4 mm., was recrystallized from petroleum ether and melted when pure at 97–98° C. It was identical with the product described above in (a).

(c) To a mixture of 15 g. of 2,5-dimethyl-2,5-hexanediol and 12 g. of phenol there was added 3.4 g. of boron trifluoride at 25–30° C. The mixture was stirred for one hour at 25–30° C. and 3 hours at 80° C. The product was then hydrolyzed with water, and the organic layer separated, washed with dilute soda solution and distilled in vacuo. The colorless syrup which came over at 120–150° C./1 mm. solidified on cooling. After recrystallization from petroleum ether, it melted at 96–97° C. and was identical with the product described in (a) above.

(d) A mixture consisting of 15 g. of 2,5-dimethyl-2,5-hexanediol, 11 g. of phenol, 50 g. of toluene, and 2 g. of "Tonsil" bleaching clay was boiled for 6 hours under a reflux condenser attached to a water trap, during which time 4.1 cc. of water was collected. The clay was then filtered off and the filtrate distilled. The fraction, B. P. 125–155° C./2 mm., solidified on cooling with a little petroleum ether, and, after several recrystallizations, gave colorless crystals, M. P. 96° C., identical with the product described in (a) above.

(e) A mixture of 22 g. 2,5-dimethyl-1,5-hexadiene, 20 g. of phenol, 4 g. tetraphosphoric acid ("Phospholeum") and 20 g. petroleum ether (B. P. 90–100° C.) was stirred 16 hours at 22–25° and one hour at 50°. The mixture was then neutralized with soda, washed and distilled. The fraction boiling 140–170° C./5 mm. crystallized from petroleum ether on cooling to −10° C. and after recrystallization melted at 94–96°. It was identical with the product described in (a) above.

Example 16.—(a) A mixture consisting of 36 g. of 2,5-dichloro-2,5-dimethyl hexane, 78 g. of benzene and 1 g. of aluminum chloride was boiled under reflux for about 4 hours until evolution of hydrogen chloride had ceased. The reaction product was hydrolyzed hot with dilute hydrochloric acid and the benzene layer separated, while still hot, from the aqueous layer. Upon cooling, the benzene layer deposited a colorless crystalline mass which after recrystallization from benzene (yield 26 g.) formed long stout needles, M. P. 220–221° C., analyzing $C_{22}H_{34}$. This product has the probable formula—

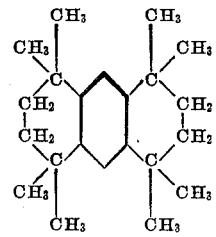

(b) A mixture consisting of 36 g. of 2,5-dichlor-2,5-dimethyl hexane, 78 g. of benzene and 16 g. of aluminum chloride was stirred at room temperature for 2 hours, then refluxed for 4 hours, and hydrolyzed with dilute hydrochloric acid. The oil layer upon distillation yielded 22.5 g. of a fraction, B. P. 95–125° C./4 mm., which upon redistillation boiled at 98–101° C./7 mm. and analyzed $C_{14}H_{20}$ corresponding to the formula—

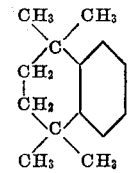

It was a colorless oil.

(c) To a mixture of 36 g. of 2,2,5,5-tetramethyl tetrahydrofurane and 78 g. of benzene which was cooled to 0° C., 35 g. of 98% sulfuric acid was added with vigorous stirring during two hours. The mixture was stirred at room temperature for 3 hours and then was poured onto ice. The yellow, organic layer was separated, washed with sodium bicarbonate solution and distilled. The fraction boiling from 95–140° C./7 mm. (12 g.) when redistilled gave a pale yellow oil, B. P. 98–101° C./7 mm., which was analyzed as $C_{14}H_{20}$, but is different in its other properties from the compound synthesized in (b) and, therefore, is an isomer.

Example 17.—A mixture consisting of 9 g. of 2,5-dichloro-2,5-dimethyl hexane, 46 g. of toluene, 1 g. of aluminum chloride and 20 g. of petroleum ether (B. P. 90–100° C.) was stirred for 20 minutes and then boiled under reflux for 4 hours. After hydrolysis with dilute hydrochloric acid, the oil layer obtained was washed and fractionally distilled. The crude product distilled over at 95–112° C./4 mm. in quantitative yield. Upon redistillation, it boiled at 94–98° C./4 mm. Colorless oil of the formula $C_{15}H_{22}$ corresponding to the formula—

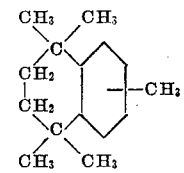

Example 18.—A mixture consisting of 18 g. of 2,5-dichloro-2,5-dimethyl hexane, 13 g. of tetrahydronaphthalene, 1 g. of aluminum chloride and 30 g. of petroleum ether (B. P. 90–100° C.) was boiled for 5 hours under reflux. After working up as described above, a yellowish oil boiling at 150–160° C./4 mm. was obtained which gradually crystallized. After recrystallization from methanol containing ethyl acetate, it formed colorless, long needles, M. P. 90–91° C. The product analyzed $C_{18}H_{26}$ corresponding to the probable formula—

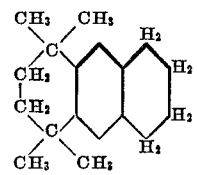

Example 19.—A mixture consisting of 18 g. of 2,5-dichloro-2,5-dimethyl hexane, 15 g. of hydrindene, 30 g. of petroleum ether (B. P. 35–70° C.) and 1 g. of anhydrous powdered aluminum chloride was stirred vigorously at room temperature for 18 hours, then refluxed for 4 hours and finally hydrolyzed with dilute hydrochloric acid. The oil which separated was distilled and the fraction boiling at 110–150° C./3 mm. collected. It formed a yellow oil which crystallized in the cold. After recrystallization from a mixture of ethyl acetate and methanol to a constant melting point, the product formed colorless plates, M. P. 93-94° C. It analyzed C₁₇H₂₄ and has the probable formula—

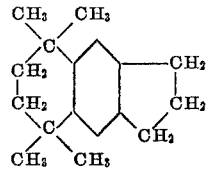

*Example 20.*—A mixture consisting of 8.5 g. of diphenylene oxide, 9 g. of 2,5-dichloro-2,5-dimethyl hexane, 30 g. of petroleum ether (B. P. 30–60° C.) and 1 g. of aluminum chloride was stirred for 9 hours at room temperature and then boiled under reflux for 1 hour. After hydrolysis as above and distillation in vacuo, two fractions were obtained, namely—

I. Thick oil, B. P. 170–240° C./4 mm., containing the mono-substituted product.

II. Crystalline residue. After recrystallization from methanol-ethyl acetate mixture, it formed colorless crystals, M. P. 201–202° C. analyzing C₂₈H₃₆O and having the probable formula—

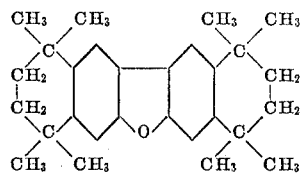

*Example 21.*—A mixture consisting of 7.1 g. of β-methyl naphthalene, 9 g. of 2,5-dichloro-2,5-dimethyl hexane, 30 g. of petroleum ether (B. P. 90–100° C.) and 1 g. of aluminum chloride was stirred ½ hour, then heated for 4 hours under reflux. The product from the hydrolysis of the above mixture, after fractionation in vacuo, gave a thick, yellowish red syrup, B. P. 170° C./5 mm.

*Example 22.*—To a mixture of 9 g. of 2,5-dichloro-2,5-dimethyl hexane, 8.4 g. of thiophene, 30 g. of petroleum ether (B. P. 90–100° C.), there was added gradually 2 g. of anhydrous stannic chloride. The mixture was stirred one hour at room temperature and then boiled under reflux for 3⅓ hours. The product was hydrolyzed with dilute hydrochloric acid, filtered, and the oil layer distilled. The fraction boiling at 90–130° C./6 mm. was collected and refractionated. The product came over at 90–97° C./6 mm. as a colorless oil, analyzing C₁₂H₁₈S, and having the probable formula—

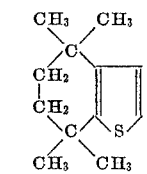

*Example 23.*—A mixture consisting of 9 g. of 2,5-dichloro-2,5-dimethyl hexane, 6 g. of pyrocatechol, 7 g. of aluminum chloride and 30 g. of petroleum ether (B. P. 30–60° C.) was stirred for 5 hours at room temperature and then boiled under reflux for ½ hour. The product was hydrolyzed with ice-cold dilute hydrochloric acid. The black, powdery product was filtered off and washed thoroughly with hot water and then with a little benzene. The solid material was then heated under reflux for one hour with excess dilute hydrochloric acid to destroy the aluminum chloride complex. The deep blue oil thus obtained was taken up in benzene and distilled in vacuo. The fraction boiling at 120–180° C./6 mm. was collected. It was dissolved in a small quantity of benzene and allowed to crystallize. The dark crystals turned white after washing with petroleum ether, and after recrystallization from benzene formed colorless, small, fine needles, M. P. 180–181° C., having the probable formula—

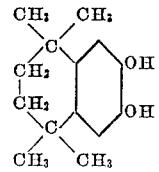

*Example 24.*—A mixture consisting of 9 g. of 2,5-dichloro-2,5-dimethyl hexane, 6.1 g. of 2-hydroxy-1,3-dimethylbenzene, 1 g. of aluminum chloride and 30 g. of petroleum ether (B. P. 90–100° C.) was stirred for one hour, and then boiled under reflux for 4 hours. The product was hydrolyzed with dilute hydrochloric acid and the solvent removed by evaporation from the oil layer. The oil was taken up in low boiling petroleum ether (B. P. 30–60° C.) and cooled in an ice-salt bath whereupon the oil crystallized in small, colorless needles which melted, when pure, at 164–165° C. The product has the following probable formula—

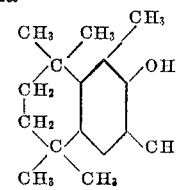

*Example 25.*—To a mixture consisting of 48 g. phenol and 5 g. of a 25% solution of boron trifluoride in phenol, cooled to about 5° C. in an ice bath, and rapidly stirred, there was added dropwise 55 g. of 2,5-dimethyl-1,5-hexadiene, CH₂=C(CH₃)—CH₂CH₂—C(CH₃)=CH₂, during a period of one hour. The thick paste containing some crystalline phenol was stirred at 5° C. for one-half hour and at 25–30° C. for 4 hours; then let stand 18 hours at room temperature. The paste was dissolved in benzene, washed with soda solution and then with water, and distilled in vacuo. The following cuts were obtained—

I. 60–100°/24 mm___Phenol
   90–120°/3 mm___Phenol
II. 120–170°/3 mm___40.5 g. (mainly 150–155°/3 mm.)
III. 170–240°/3 mm___21 g. (recrystallized from benzene, M. P. 237–242°)
IV. 240–320°/3 mm___24 g. (thick oil)

Fraction II upon redistillation yielded a crystalline product which after crystallization from petroleum ether melted at 143–146° and was identical with the product M. P. 145.5° described in Example 1a. Fraction III after recrystallization from petroleum ether formed colorless crystals M. P. 238–240° having the probable formula—

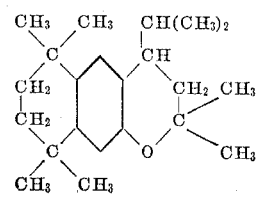

or

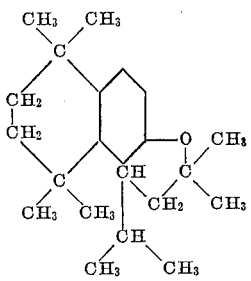

Fraction IV probably contains the tri-substituted product containing an additional alicyclic group.

In place of the 1,4-glycols disclosed in the foregoing examples one may use any other glycol of the general formula heretofore given, as, for instance, any of the 1,4-glycols obtained by the hydrogenation of any of the acetylenic glycols disclosed in copending application Serial No. 232,852, filed October 1, 1938.

We claim:

1. A cycli-alkylation process which comprises condensing in the presence of a cationoid condensing agent an aromatic compound having adjacent nuclear hydrogen atoms available for substitution, and a member of the group consisting of 1,4-butylene glycols having at least one hydrocarbon substituent on each of the terminal carbon atoms, the dehydration products thereof, and the 1,4-halogen analogue thereof.

2. The process which comprises condensing in the presence of an acidic condensing agent an aromatic compound having at least two adjacent nuclear hydrogen atoms available for substitution, and a member of the group consisting of 1,4-butylene glycols, having at least one hydrocarbon substituent on each of the terminal carbon atoms, the dehydration products thereof, and the 1,4-halogen analogue thereof.

3. The process which comprises condensing in the presence of sulfuric acid an aromatic compound having adjacent nuclear hydrogen atoms available for substitution and a member of the group consisting of 1,4-butylene glycols, having at least one hydrocarbon substituent on each of the terminal carbon atoms, the dehydration products thereof and the 1,4-halogen analogue thereof.

4. The process which comprises condensing in the presence of a Friedel-Crafts' condensing agent an aromatic compound having at least two adjacent nuclear hydrogen atoms available for substitution and a member of the group consisting of 1,4-butylene glycols, having at least one hydrocarbon substituent on each of the terminal carbon atoms, the dehydration products thereof, and the 1,4-halogen analogue thereof.

5. The process which comprises condensing in the presence of anhydrous aluminum chloride an aromatic compound having adjacent nuclear hydrogen atoms available for substitution and a member of the group consisting of 1,4-butylene glycols, having at least one hydrocarbon substituent on each of the terminal carbon atoms, the dehydration products thereof, and the 1,4-halogen analogue thereof.

6. The process which comprises condensing in the presence of boron trifluoride an aromatic compound having at least two adjacent nuclear hydrogen atoms available for substitution and a member of the group consisting of 1,4-butylene glycols, having at least one hydrocarbon substituent on each of the terminal carbon atoms, the dehydration products thereof, and the 1,4-halogen analogue thereof.

7. Condensation products identical with those obtainable by condensing in the presence of a cationoid condensing agent an aromatic compound having at least two adjacent nuclear hydrogen atoms available for substitution and a member of the group consisting of 1,4-butylene glycols having two hydrocarbon substituents on each of the terminal carbon atoms, the dehydration products thereof and the 1,4-halogen analogue thereof.

8. The product identical with that obtainable by condensing in the presence of an acidic condensing agent an aromatic compound having at least two adjacent nuclear hydrogen atoms available for substitution and a member of the group consisting of 1,4-butylene glycols, having two hydrocarbons substituents on each of the terminal carbon atoms, the dehydration products thereof and the 1,4-halogen analogue thereof.

9. A product identical with that obtainable by condensing in the presence of an acidic condensing agent an aromatic compound of the benzene series having at least two adjacent nuclear hydrogen atoms available for substitution and a member of the group consisting of 1,4-butylene glycols, having two hydrocarbon substituents on each of the terminal carbon atoms, the dehydration products thereof and the 1,4-halogen analogue thereof.

10. A product identical with that obtainable by condensing in the presence of an acidic condensing agent an aromatic compound of the benzene series having at least two adjacent nuclear hydrogen atoms available for substitution and a 1,4-butylene glycol having two alkyl hydrocarbon substituents on each of the terminal carbon atoms.

11. A product identical with that obtainable by condensing in the presence of an acidic condensing agent an aromatic compound of the benzene series having at least two adjacent nuclear hydrogen atoms available for substitution and a 1,4-butylene glycol, having two aryl hydrocarbon substituents on each of the terminal carbon atoms.

12. A product identical with that obtainable by condensing in the presence of an acidic condensing agent an aromatic compound of the naphthalene series having at least two adjacent nuclear hydrogen atoms available for substitution and a 1,4-butylene glycol, having two hydrocarbon substituents on each of the terminal carbon atoms.

13. A product identical with that obtainable by condensing in the presence of an acidic condensing agent one mol of an aromatic compound having two pairs of adjacent nuclear hydrogen atoms available for substitution, and two mols of a member of the group consisting of 1,4-butylene glycols having two hydrocarbon substituents on each of the terminal carbon atoms, the dehydration products thereof, and the 1,4-halogen analogues thereof.

14. A compound having the formula—

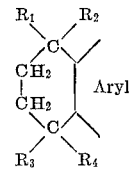

wherein $R_1$, $R_2$, $R_3$, and $R_4$ represent hydrocarbon groups and "Aryl" signifies an aromatic residue.

15. A compound having the formula—

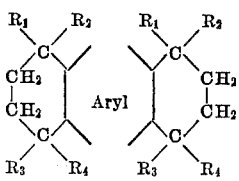

wherein $R_1$, $R_2$, $R_3$, and $R_4$ represent hydrocarbon groups and "Aryl" signifies an aromatic residue.

16. A compound having the formula—

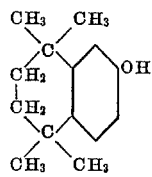

which when pure forms colorless crystals, melting at about 145° C.

17. A compound having the formula—

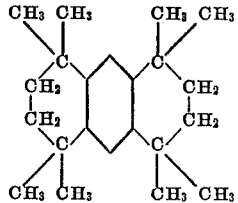

which when pure forms colorless crystals melting at about 221° C.

18. A compound having the formula—

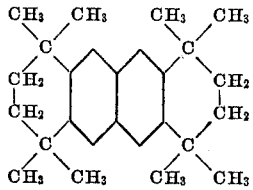

which when pure melts at about 318° C.

HERMAN A. BRUSON.
JOHN W. KROEGER.